Figure 1:
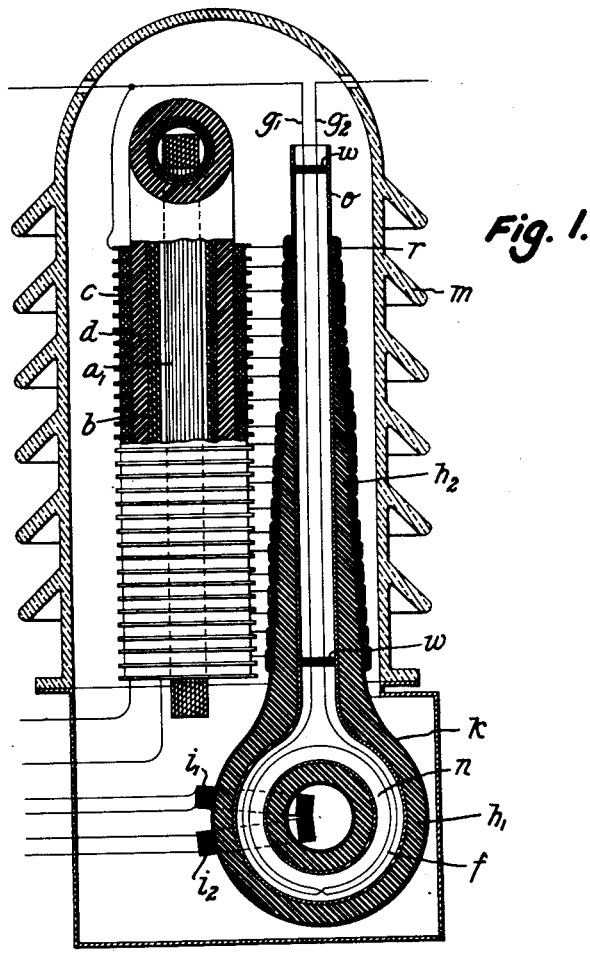

May 5, 1953 A. MEYERHANS ET AL 2,637,821
COMBINED VOLTAGE AND CURRENT TRANSFORMER
Filed Sept. 13, 1950 2 SHEETS—SHEET 1

Inventors:-
August Meyerhans,
Hans Hartmann,
By Pierce, Scheffler & Parker,
Attorneys.

Patented May 5, 1953

2,637,821

UNITED STATES PATENT OFFICE 2,637,821

COMBINED VOLTAGE AND CURRENT TRANSFORMER

August Meyerhans, Nussbaumen, near Baden, and Hans Hartmann, Baden, Switzerland, assignors to Aktiengesellschaft Brown, Boveri & Cie., Baden, Switzerland Application September 13, 1950, Serial No. 184,622
In Switzerland August 4, 1949

5 Claims. (Cl. 307—11)

This invention relates to a combined voltage and current transformer assembly for use on high voltage electric lines, and more particularly to transformers of step-down type for energizing measuring or control apparatus.

The combination of voltage and current transformers in a single unit is a very desirable object in connection with the design of high voltage measuring apparatus, because such a combination has a favourable effect on the price and requires very little space when it has to be installed in an electric plant.

It has already been proposed to combine current and voltage transformers to such an extent that both systems are electromagnetically linked together. The flux-conducting parts of the voltage transformer have for instance been located parallel to the high voltage winding of the current transformer. Combined arrangements with electromagnetic interlinkage of those parts of the current and voltage transformers which form the flux and current circuits, require the provision of additional means, such as for instance special separating slots in order to avoid short circuits between windings. This can however have a detrimental effect on the measuring accuracy. Attempts have also been made to construct such combined transformers for instance by employing open iron cores, but this also has an undesirable effect on the measuring qualities.

The object of the present invention is to combine two transformers, each of which has most favourable measuring and constructional properties, so as to form a single unit. As regards the voltage transformer, the most favourable properties are achieved with two wound limbs and a closed magnetic circuit. It is then also possible to provide means which allow the potential to increase uniformly from the earthed end of the winding to the high-voltage end. The current transformer is preferably constructed with a ring winding, because as regards current strength this enables a most universal type to be obtained whilst retaining maximum measuring properties. Its high voltage winding is expediently constructed as a circular winding with straight leading-in wires, and both parts are surrounded with a jointless insulating casing, for instance of paper. The annular part of the insulating casing is preferably covered with an earthed conductive layer.

The present invention thus concerns the combination of a voltage transformer with a current transformer of the same phase, consisting of a voltage transformer with two-limbed magnetic circuit and with an approximately uniformly increasing potental from earth up to the high voltage side, and furthermore a current transformer with a ring-shaped high-voltage winding embedded in an insulating casing and straight insulated leading-in wires, the limbs of the voltage transformer and the leads of the current transformer being housed within an insulating covering.

Figure 2:
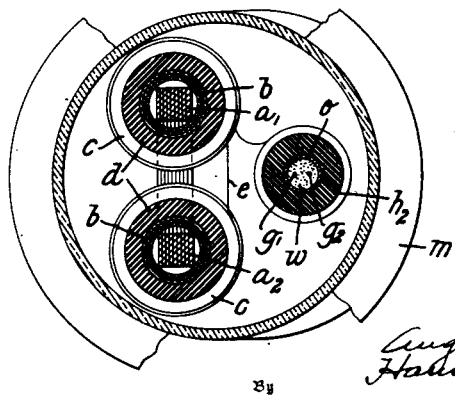
Figure 3:
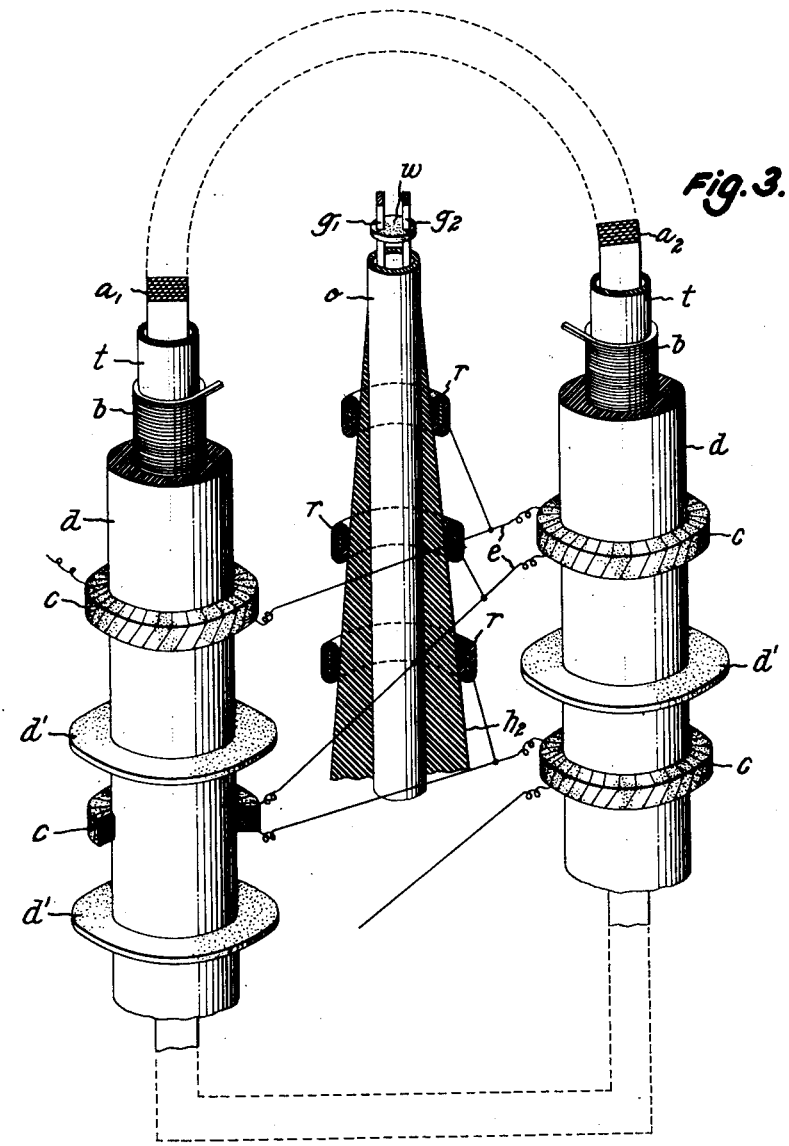

A constructional example of the invention is illustrated in the accompanying drawing in a schematic manner, where Fig. 1 shows a combined voltage and current transformer partly in elevation and partly in vertical section, Fig. 2 a cross-section of the same combined unit, and Fig. 3 is a fragmentary perspective view, enlarged but not to scale, showing the relative arrangements and circuit connections of the transformer windings and the control rings.

The two limbs of the core of the voltage transformer with a closed magnetic circuit are indicated by $a_1$, $a_2$, the low-voltage winding $b$ of this transformer being wound on tubes $t$ of insulating material which are fitted over these limbs. The high-voltage winding of the voltage transformer is indicated by $c$. An insulating cylinder $d$ made of paper layers is provided between the high and low-voltage windings, and insulating washers $d'$ are arranged between sections of the high-voltage winding $c$ which consists of a number of insulated part coils, each coil on one limb alternately connected to the next coil on the other limb as shown schematically in Fig. 3. The coil connections are indicated in Figs. 2 and 3 by reference letter $e$. By this means a potential gradient is achieved which increases approximately uniformly from earth to the high-voltage side. The high-voltage winding $f$ of the current transformer is ring shaped and within a hollow metal annulus $n$ which has an opening defined by a flaring upper wall section which merges smoothly into a metal tube $o$. The current connections to the ring winding are established by the straight leads $g_1$, $g_2$ which pass through the tube $o$ and are insulated from the tube and from each other by a plurality of washers $w$ of insulating material and having slots through which the leads are threaded. The annular housing $n$ and the metal tube $o$ are enclosed within insulating paper windings $h_1$, $h_2$ respectively, and care should be taken that the transition from one winding to the other is effected smoothly and that there are no discontinuities or air spaces where the paper windings merge into each other.

Reference letters $i_1$, $i_2$ indicate the iron cores which support the low-voltage winding of the current transformer and surround the insulated ring-shaped high-voltage winding $f$. Both wound limbs of the voltage transformer and the insulated leads of the current transformer are arranged inside the insulator $m$ in such a manner that when regarded in plan view they form the corners of an approximately equilateral triangle. The uniformly rising potential of the voltage transformer is utilized to control the voltage gradient along the insulation $h_2$ of the leads of the current transformer. This is for instance achieved by means of insulated control rings $r$ which are arranged on the insulating sheath $h_2$ of the current transformer leads and are connected to the coils of the voltage transformer. Both limbs of the voltage transformer and the leads of the current transformer can be arranged in parallel planes, as shown in the drawing, or inclined towards each other. The outer surface of the insulation winding $h_2$ not covered by the control rings $r$, and the outer insulating winding $h_1$, are provided with a metallized coating $k$.

The arrangement according to the invention has the advantage that the ceramic insulator $m$ which is used for enclosing at least the active parts of the transformer combination and also serves as an oil container, has the smallest possible diameter. This is important because the ceramic insulator is practically the most expensive element of the combined unit. When compared with the diameter of the ceramic insulator required for a simple voltage transformer, the diameter of the insulator used for a combined transformer unit in accordance with the invention is only slightly larger, because the leads for the current transformer are located in the space which is left free beside the limbs of the voltage transformer.

In addition to the favourable constructional form and good measuring properties achieved with the combined unit, the latter also has a further advantage as regards operational properties. When transients occur, the voltage distribution across the voltage transformer will no longer be linear in character. The voltage controlling elements $r$ on the insulation winding $h_2$ of the current transformer leads are therefore utilized to improve the voltage distribution when a voltage impulse occurs, the control rings on the current transformer being used to produce a capacitive effect on the part coils of the high-voltage winding of the voltage transformer. The currents flowing from the high-voltage winding to the low-voltage winding of the voltage transformer are thus entirely or partly supplied by the high-voltage winding of the current transformer. The result is that the voltage distribution along the voltage transformer is approximately linear.

We claim:

1. The combination of a voltage transformer with a current transformer of the same phase, said combination comprising a voltage transformer with a two-limbed magnetic circuit, a high voltage primary winding including a plurality of individual coils on each limb of the magnetic circuit and serially connected in alternation from the grounded end to the high voltage end of said winding, thereby to provide an approximately uniformly increasing potential distribution from the grounded end to the high voltage end of said winding, and a low voltage secondary winding including sections upon each of said limbs; and a current transformer having an annular high-voltage winding in an insulating casing and having straight insulated leads, and an annular iron core threaded through said annular high voltage winding and carrying a secondary winding; the limbs of said voltage transformer and the leads of said current transformer being housed within an insulator.

2. Combination as in claim 1, characterised in that both limbs of the voltage transformer and the leads of the current transformer are so arranged in the insulator that they are located at the corners of an equilateral triangle.

3. Combination as in claim 2, characterised in that the limbs of the voltage transformer and the leads of the current transformer are located in parallel planes.

4. Combination as in claim 1, in combination with an insulating sheath through which said straight insulated leads extend, and means energized by voltage transformer to establish a voltage gradient along said sheath.

5. Combination as in claim 4, characterised in that said means comprises mutually insulated rings arranged on the insulating sheath of the current transformer leads and connected to the coils of the voltage transformer in succession at spaced points along the same.

AUGUST MEYERHANS.
HANS HARTMANN.

References Cited in the file of this patent

UNITED STATES PATENTS

| Number | Name | Date |
|---|---|---|
| 1,586,533 | Peterson | June 1, 1926 |
| 2,182,641 | Poleck | Dec. 5, 1939 |
| 2,314,851 | Barney | Mar. 23, 1943 |
| 2,431,244 | Griscom | Nov. 18, 1947 |